UNITED STATES PATENT OFFICE.

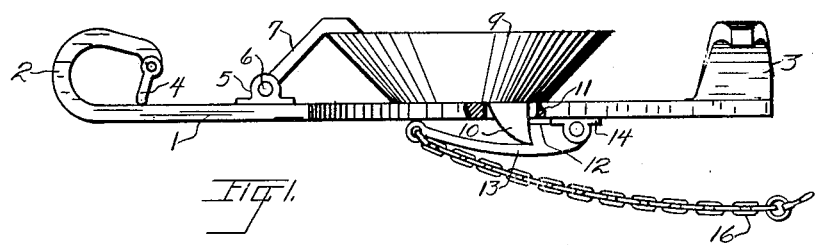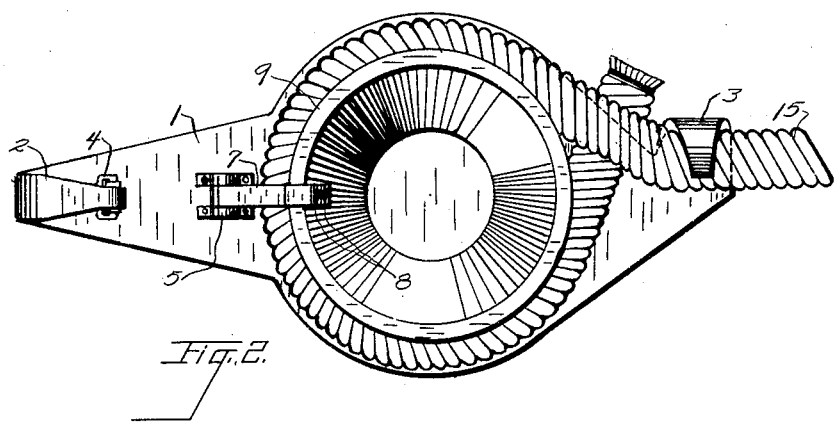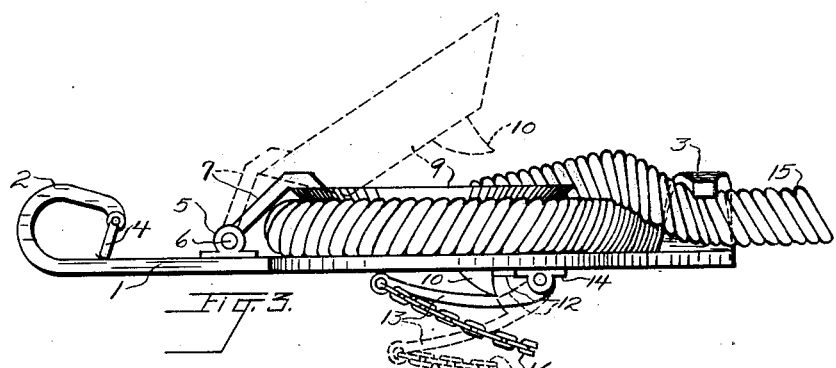

JOHN HÄGGBLOM, OF MANISTIQUE, MICHIGAN.

CABLE-COUPLING.

1,370,963.  Specification of Letters Patent.  Patented Mar. 8, 1921.

Application filed June 26, 1919. Serial No. 306,969.

*To all whom it may concern:*

Be it known that I, JOHN HÄGGBLOM, a citizen of the United States, residing at Manistique, in the county of Schoolcraft and State of Michigan, have invented certain new and useful Improvements in Cable-Couplings, of which the following is a specification.

This invention relates to improvements in cable couplings and its object is to provide means for releasably binding and supporting a cable at one end or at any point between its ends. Cables used on derricks, stump pullers or the like may be readily secured to the machine by my improved coupling; the end of a clothes line may be supported or like uses may be made of the invention. With the foregoing and other objects in view the invention consists in the combination and arrangement of parts to be hereinafter fully described, pointed out in the appended claim and illustrated in the accompanying drawing which forms a part of this specification and in which—

Figure 1 is a view of my improved cable coupling in side elevation.

Fig. 2 is a plan view of the device illustrating its application.

Fig. 3 is a side view of Fig. 2 with the binding post shown in raised or inoperative position in dotted lines.

Like reference characters denote corresponding parts throughout the several views.

My cable coupling comprises the base plate 1 having the oppositely disposed hooks 2, 3, the one hook being positioned at right angles to the other and the hook 2 carrying the keeper 4 pivotally supported and normally in engagement, through gravity, with the base plate 1 which plate limits movement of the keeper in a direction away from the hook 2. The base plate may be supported either by a hook, bracket or rope and the keeper 4 serving to prevent accidental removal of said support. A bearing 5 secured to the base plate carries a pin 6 that pivotally carries the angular finger 7 that is secured by screws 8 to the tapered binding post 9 to the base of which the tooth 10 is secured, said tooth extending through a perforation 11 in the base plate for engagement with the rounded edge of a lip 12 formed upon an arm 13 fulcrumed in a bearing 14 secured to the opposite face of the base plate 1 with relation to the bearing 5.

In operation the binding post 9 is disposed upon the base plate with the tooth 10 in engagement with the said lip 12. The cable 15 is then placed about the binding post as shown, the free end of the cable passing between the guide hook 3 and the binding post and the cable strand passing over said free end and through the guide hook. The load carried by the cable will cause it to bind against the plate 1, the beveled or tapered periphery of the binding post causing a rope-thrust against the plate 1. The arm 13 may be provided with a chain 16 to enable the operator to readily move the arm when it is desired to release the cable. When the arm 13 is out of engagement with the tooth 10 the binding post may be readily raised manually into the position shown dotted in Fig. 3 and the cable is freed.

What is claimed is:—

In a cable coupling, a perforated base plate having hooks formed at its ends, one of said hooks being disposed at one side of the base plate and at right angles to the longitudinal center line thereof, a finger fulcrumed upon one side of said base plate, a tapered binding post carried by said finger and disposed between the same and the last named hook, said binding post and last named hook being spaced away from each other to receive the cable in such manner as to cause the load to bind the cable against said base plate, an arm fulcrumed to the opposite side of said base plate with relation to said finger, a lip integral with said arm, and a tooth carried by said binding post for disposal in the perforation in said base plate and releasable engagement with said lip.

In testimony that I claim the foregoing as my own I have hereto affixed my signature in the presence of two subscribing witnesses.

JOHN HÄGGBLOM.

Witnesses:
 WALTER DREVDAHL,
 PAUL R. BALDWIN.